(12) United States Patent
Tsai et al.

(10) Patent No.: US 12,216,377 B2
(45) Date of Patent: Feb. 4, 2025

(54) OPTICAL MODULATING DEVICE

(71) Applicant: Molex, LLC, Lisle, IL (US)

(72) Inventors: Kuen-Ting Tsai, Tainan (TW);
Zuon-Min Chuang, New Taipei (TW)

(73) Assignee: Molex, LLC, Lisle, IL (US)

( * ) Notice: Subject to any disclaimer, the term of this patent is extended or adjusted under 35 U.S.C. 154(b) by 769 days.

(21) Appl. No.: 17/329,206

(22) Filed: May 25, 2021

(65) Prior Publication Data

US 2021/0364879 A1    Nov. 25, 2021

(30) Foreign Application Priority Data

May 25, 2020  (CN) .......................... 202010449034.4

(51) Int. Cl.
  *G02F 1/225*  (2006.01)
  *G02B 6/293*  (2006.01)
  *G02F 1/21*   (2006.01)
(52) U.S. Cl.
  CPC .......... *G02F 1/225* (2013.01); *G02B 6/2935* (2013.01); *G02F 1/212* (2021.01)
(58) Field of Classification Search
  CPC ........ G02F 1/225; G02F 1/212; G02B 6/2935
  USPC ......................................................... 359/315
  See application file for complete search history.

(56) References Cited

U.S. PATENT DOCUMENTS

| 5,524,076 A | 6/1996 | Rolland et al. |
| 6,535,653 B1 | 3/2003 | Hung et al. |
| 6,618,536 B1* | 9/2003 | Heideman .......... G01N 21/7703 385/132 |
| 9,843,390 B2 | 12/2017 | Liu et al. |
| 2008/0008412 A1 | 1/2008 | Doi |
| 2009/0220185 A1 | 9/2009 | Wada et al. |

(Continued)

FOREIGN PATENT DOCUMENTS

| JP | 2008009314 A | 1/2008 |
| JP | 2012519873 A | 8/2012 |
| JP | 2014219571 A | 11/2014 |

(Continued)

OTHER PUBLICATIONS

Notice of Reasons for Refusal received for Japanese Patent Application No. 2021-086928, mailed on Apr. 5, 2022, 10 pages (5 pages of English translation and 5 pages of official notification).

(Continued)

*Primary Examiner* — William Choi

(57) ABSTRACT

An optical modulating device of the present disclosure includes an optical splitter, an optical phase modulator and an optical combiner. The optical splitter splits an inputting optical signal by an optical splitting ratio to generate a first split optical signal and a second split optical signal. The optical phase modulator phase modulates the first split optical signal and the second split optical signal to respectively generate a first modulating optical signal and a second modulating optical signal. The optical combiner combines the first modulating optical signal and the second modulating optical signal by a combining ratio to generate an outputting optical signal having a chirp, the combining ratio being equal to the optical splitting ratio, a value of the combining ratio being a positive number, and the value being less than one or more than one.

10 Claims, 3 Drawing Sheets

(56) References Cited

U.S. PATENT DOCUMENTS

2019/0342028 A1   11/2019   He et al.

FOREIGN PATENT DOCUMENTS

| JP | 2017153068 A | 8/2017 |
| TW | 201504714 A | 2/2015 |
| WO | 2005096086 A1 | 10/2005 |
| WO | 2006034469 A2 | 3/2006 |
| WO | 2006100719 A1 | 9/2006 |

OTHER PUBLICATIONS

Office Action received for JP Application No. 2021-086928, mailed on Aug. 9, 2022, 11 Pages (06 Pages of English Translations and 07 Pages of Official notification).

Extended European search report and Opinion received for EP Patent application No. 21174816.5, mailed on Oct. 25, 2021, 9 pages.

Lawetz et al., "Modulation Characteristics of Semiconductor Mach-Zehnder Optical Modulators", Journal of Lightwave Technology, vol. 15, No. 4, Apr. 1997, pp. 697-703.

\* cited by examiner

OPTICAL MODULATING DEVICE

RELATED APPLICATIONS

The present application claims priority to Chinese Patent Application No. 202010449034.4 filed May 25, 2020 which is incorporated by reference in its entirety.

TECHNICAL FIELD

The present disclosure relates to a device, and particularly relates to an optical modulating device.

BACKGROUND

In optical fiber communication systems, optical fiber dispersion is a phenomenon that optical waves are dispersed into optical spectrum components with different wavelengths due to dependence of wave velocity on wavelength. When an optical signal or pulse emitted by an optical modulating device is projected into, for example, an optical fiber channel, an envelope thereof propagates along the fiber channel at wave group velocities to an optical receiving device. Since this pulse contains a series of optical spectrum components, each optical spectrum component travels at a different wave group velocity, causing group velocity dispersion (GVD), intramodal dispersion or simple optical fiber dispersion. This dispersion phenomenon also is often referred to as pulse broadening. When the pulse travels along the optical fiber, the optical spectrum components continue to be dispersed in space and time, the pulse will become too wide, a front edge of a pulse overlaps a rear edge of a previous pulse, and inter symbol interference (ISI) will occur and the bit will be blurred, which causes that, when the optical receiving device receives the optical signal and demodulate based on the optical signal, the optical receiving device is unable to identify the difference between the "0" bit and the "1" bit and results in demodulation error. In addition, the dispersion of the optical fiber is directly ratio to a length of the optical fiber, that is, a transmission distance of the optical signal is limited by the dispersion of the optical fiber. Moreover, a signal-to-noise ratio (SNR) of the optical signal received by the optical receiving device will also affect demodulation accuracy of the optical receiving device.

As such, the signal-to-noise ratio and the dispersion of the optical fiber becomes one of the important factors affecting the signal quality of optical fiber communication. Therefore, how to avoid the signal-to-noise ratio being too low and the dispersion of the optical fiber seriously affecting the optical fiber communication system in order to promote the optical transmission distance is a subject to be improved by the relevant communication entities.

SUMMARY

Therefore, an object of the present disclosure is to provide an optical modulating device which can overcome the deficiency of the existing technology.

Accordingly, an optical modulating device of the present disclosure comprises an optical splitter, an optical phase modulator and an optical combiner. Thee optical splitter is used to receive an inputting optical signal and split the inputting optical signal by an optical splitting ratio to generate a first split optical signal and a second split optical signal. The optical phase modulator couples the optical splitter to receive the first split optical signal and the second split optical signal and phase modulate the first split optical signal and the second split optical signal to respectively generate a first modulating optical signal and a second modulating optical signal. The optical combiner couples the optical phase modulator to receive the first modulating optical signal and the second modulating optical signal and combine the first modulating optical signal and the second modulating optical signal by a combining ratio to generate an outputting optical signal having a chirp, the combining ratio being equal to the optical splitting ratio, a value of the combining ratio being a positive number, and the value being less than one or more than one.

The effect of the present disclosure lies in that: by that the optical splitting ratio is equal to the optical combining ratio, it makes the outputting optical signal have a better signal-to-noise ratio, so that the optical receiving device has better demodulation accuracy when the optical receiving device receives the outputting optical signal and demodulates according to the outputting optical signal, and the outputting optical signal has the chirp, it may reduce effect of a dispersion caused by the optical fiber on transmission of the outputting optical signal, in turn promote transmission performance of the optical communication system.

BRIEF DESCRIPTION OF THE DRAWINGS

Other features and technical effects of the present disclosure will be apparent in an embodiment referring to the accompanying figures, in which.

DETAILED DESCRIPTION OF THE PREFERRED EMBODIMENTS

Figure 1:
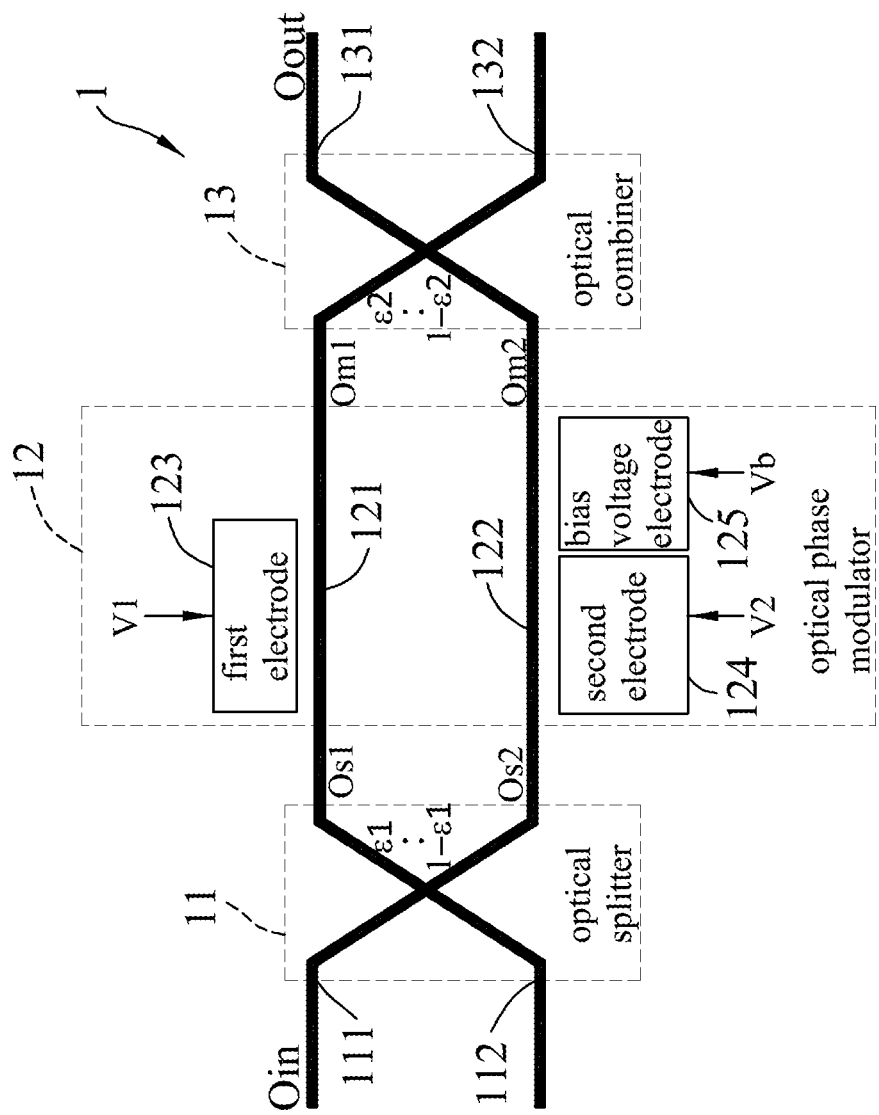
FIG. 1 is a plan diagram illustrating a first embodiment of an optical modulating device of the present disclosure.

Before the present disclosure is described in detail, it should be noted that like elements are denoted by the same reference numerals in the following description.

First Embodiment

Referring to FIG. 1, an embodiment of an optical modulating device 1 of the present disclosure is adapted to an optical communication system (not shown). The optical communication system includes an optical fiber (not shown) and an optical receiving device (not shown). The optical modulating device 1 is used to modulate an inputting optical signal Oin having a continuous wave, to generate and emit an outputting optical signal Oout having a chirp and transmit the outputting optical signal Oout to the optical receiving device via the optical fiber. The optical receiving device demodulates the outputting optical signal Oout received by the optical receiving device.

The optical modulating device 1 of the present embodiment includes an optical splitter 11, an optical phase modulator 12 and an optical combiner 13. The optical modulating device 1 is a Mach-Zehnder modulator (MZM), the Mach-Zehnder modulator is made of one of a LiNbO3-based, a Silicon and an Inp.

The optical splitter 11 is used to receive the inputting optical signal Oin, and split the inputting optical signal Oin by an optical splitting ratio (that is, $\varepsilon 1:(1-\varepsilon 1)$, $0<\varepsilon 1<1$), to generate a first split optical signal Os1 and a second split optical signal Os2. It is noted that, in the present embodiment, the optical splitter 11 is an optical directional coupler, and only receives the inputting optical signal Oin, but the present disclosure is not limited thereto. In other embodiments, an inputting end 111 of the optical splitter 11 receives the inputting optical signal Oin, and another inputting end 112 receives another inputting optical signal. The optical splitter 11 may be a Y-branch waveguide or a multi-mode interferometer.

The optical phase modulator 12 couples the optical splitter 11 to receive the first split optical signal Os1 and the second split optical signal Os2 and phase modulate the first split optical signal Os1 and the second split optical signal Os2, so as to respectively generate a first modulating optical signal Om1 and a second modulating optical signal Om2. In the present embodiment, the optical phase modulator 12 includes a first waveguide 121, a second waveguide 122, a first electrode 123, a second electrode 124 and a bias voltage electrode 125.

The first waveguide 121 is coupled between the optical splitter 11 and the optical combiner 13, receives the first split optical signal Os1 from the optical splitter 11, and generates the first modulating optical signal Om1 based on the first split optical signal Os1. The second waveguide 122 is coupled between the optical splitter 11 and the optical combiner 13, receives the second split optical signal Os2 from the optical splitter 11, and generates the second modulating optical signal Om2 based on the second split optical signal Os2. The first electrode 123 is provided corresponding to the first waveguide 121, and is used to receive a first modulating voltage V1. The second electrode 124 is provided corresponding to the second waveguide 122, and is used to receive a second modulating voltage V2. Specifically, the first electrode 123 and the second electrode 124 are provided on an upper surface of the first waveguide 121 and an upper surface of the second waveguide 122 respectively. The first electrode 123 and the second electrode 124 cause a refractive index of the first waveguide 121 itself and a refractive index of the second waveguide 122 itself to generate change respectively according to the first modulating voltage V1 and the second modulating voltage V2 (for example, generate heat according to the first modulating voltage V1 and the second modulating voltage V2 to cause the refractive index of the first waveguide 121 and the refractive index of the second waveguide 122 to change, but the present disclosure is not limited thereto), to cause a propagating speed of the first split optical signal Os1 propagated by the first waveguide 121 and a propagating speed of the second split optical signal Os2 propagated by the second waveguide 122 to change (that is, a phase difference is generated between a light propagated in the first waveguide 121 and a light propagated in the second waveguide 122 (that is, phase modulate)), and respectively generate the first modulating optical signal Om1 and the second modulating optical signal Om2. As such, a phase of the first modulating optical signal Om1 and a phase of the second modulating optical signal Om2 change respectively as the first modulating voltage V1 and the second modulating voltage V2 change.

The bias voltage electrode 125 is provided corresponding to the second waveguide 122 and the second electrode 124 (or, the bias voltage electrode 125 is provided corresponding to the first waveguide 121 and the first electrode 123), and is used to receive a bias voltage signal Vb.

Specifically, a polarity the chirp of the outputting optical signal Oout is associated with a positive slope or a negative slope of a transfer function of the optical modulating device 1 operated at itself, and a magnitude of the chirp of the outputting optical signal Oout is associated with an offset of a bias voltage point of the optical modulating device 1 from a quadrature point of the transfer function. Therefore, by making the optical phase modulator 12 controlled by the bias voltage signal Vb, the present embodiment adjusts the optical modulating device 1 to be operated at the positive slope or the negative slope of the transfer function, so as to change the polarity of the chirp, and changes the magnitude of the chirp with making the bias voltage point offset from the quadrature point of the transfer function by the bias voltage signal Vb, so that the chirp of the outputting optical signal Oout changes as the bias voltage signal Vb changes.

The optical combiner 13 couples the optical phase modulator 12 to receive the first modulating optical signal Om1 and the second modulating optical signal Om2, and combine the first modulating optical signal Om1 and the second modulating optical signal Om2 by a combining ratio (that is, $\varepsilon 2:(1-\varepsilon 2)$, $0<\varepsilon 2<1$), so as to generate the outputting optical signal Oout. It is noted that, both the combining ratio and the optical splitting ratio are constants. The combining ratio is equal to the optical splitting ratio (that is, $\varepsilon 1:(1-\varepsilon 1)=\varepsilon 2:(1-\varepsilon 2)$), a value of the combining ratio is a positive number, and the value is less than one (1) or more than one (1). Moreover, in the present embodiment, the optical combiner 13 is an optical directional coupler, and only outputs the outputting optical signal Oout, but the present disclosure is not limited thereto. In other embodiments, an outputting end 131 of the optical combiner 13 outputs the outputting optical signal Oout, and another outputting end 132 of the optical combiner 13 outputs another outputting optical signal. The outputting optical signal Oout and the another outputting optical signal may have different chirps. The optical combiner 13 may be a Y-branch waveguide or a multi-mode interferometer.

In the present embodiment, an amplitude of the first modulating voltage V1 and an amplitude of the second modulating voltage V2 are identical, and the phase of the first modulating voltage V1 and the phase of the second modulating voltage V2 differ from each other by 180 degrees. An optical modulation amplitude (OMA) of the outputting optical signal Oout may be obtained by the following equation (1):

$$\text{OMA}=\text{Po, max}-\text{Po, min}=4\times\sqrt{1-\varepsilon 1}\times\sqrt{1-\varepsilon 2}\times\sqrt{\varepsilon 1}\times\sqrt{\varepsilon 2}\times\text{Pin} \qquad \text{equation (1)},$$

where, a parameter OMA is the optical modulation amplitude, a parameter Po,max and a parameter Po,min are a maximum optical power and a minimum optical power of the outputting optical signal Oout respectively, a parameter $\varepsilon 1$ is a first value of the optical splitting ratio, a parameter $\varepsilon 2$ is a first value of the combining ratio, a parameter Pin is an optical power of the inputting optical signal Oin. As can be seen from the equation (1), the optical modulation amplitude OMA of the outputting optical signal Oout is associated with the optical splitting ratio and the combining ratio, therefore, when the present disclosure determines a wavelength and a transmission distance of the inputting optical signal Oin and knows a dispersion amount of an optical fiber corresponding to the inputting optical signal Oin, the chirp of the outputting optical signal Oout is selected according to the dispersion amount of the optical fiber, and the chirp as desired is obtained by adjusting the bias voltage signal Vb, and the optical splitting ratio and the combining ratio are preset in a manner, so that the outputting optical signal Oout has the chirp while the optical modulation amplitude OMA is maximized. As such, when the outputting optical signal Oout is transmitted to the optical receiving device via the optical fiber, the outputting optical signal Oout still has a better signal-to-noise ratio (SNR).

Figure 2:
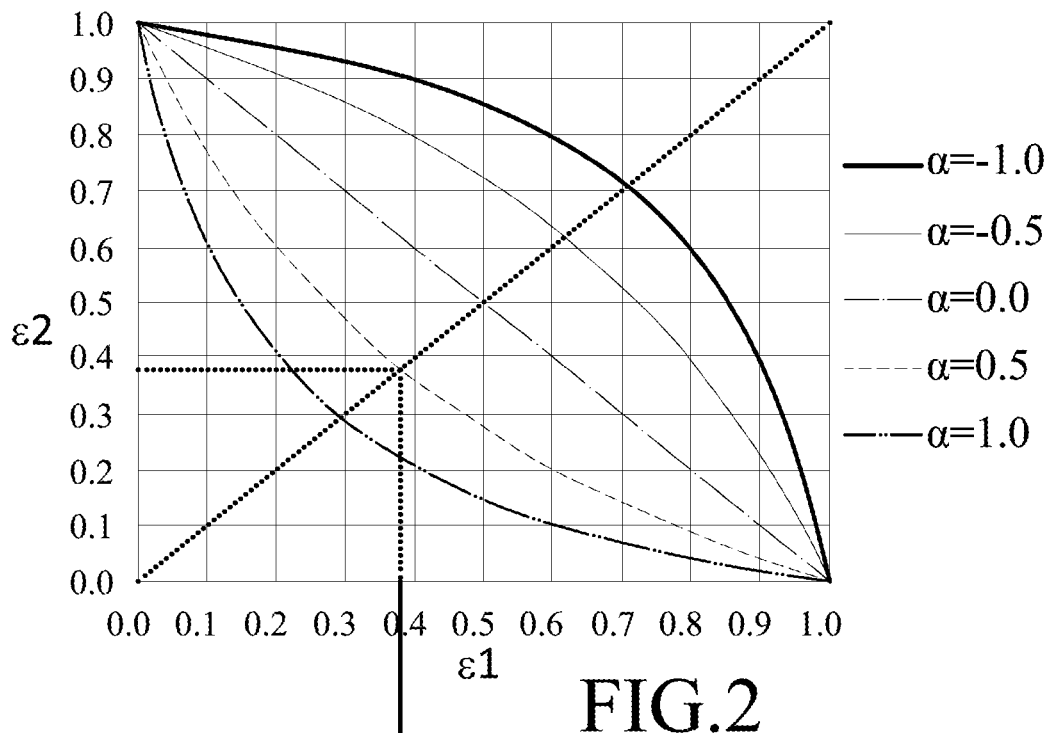
FIG. 2 is a simulation diagram illustrating that, when a chirp of an outputting optical signal of the first embodiment takes different values, a first value of a combining ratio changes as a first value of an optical splitting ratio.
Figure 3:
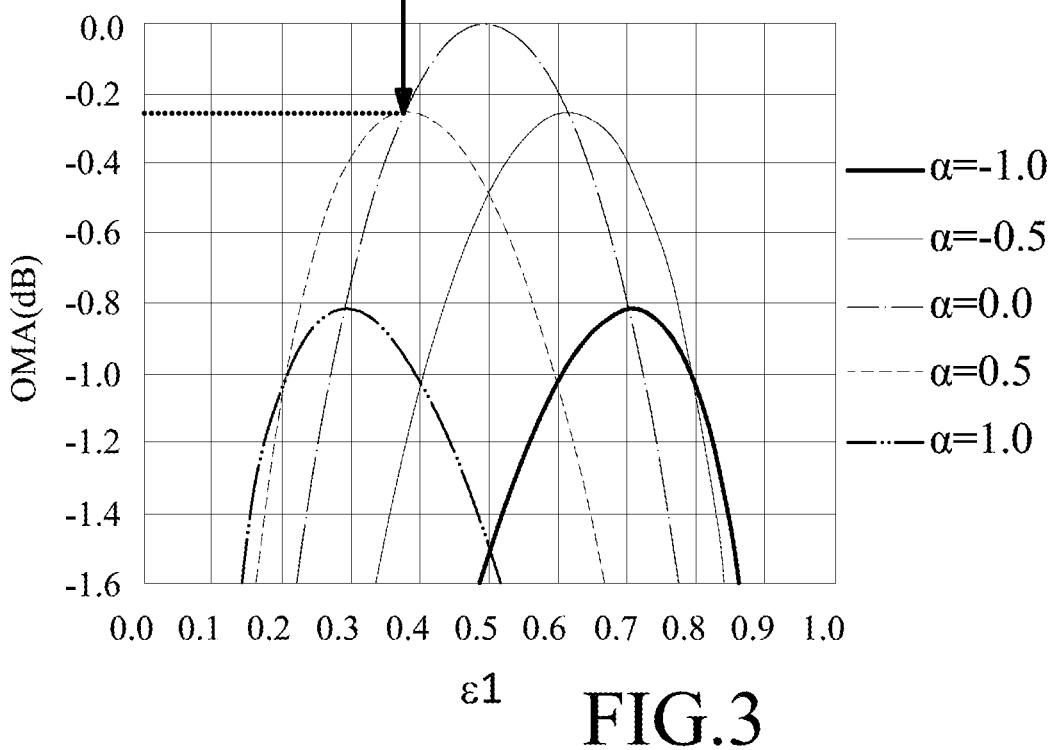
FIG. 3 is a simulation diagram illustrating that, when the chirp of the outputting optical signal of the first embodiment takes different values, an optical modulation amplitude of the outputting optical signal changes as the first value of the optical splitting ratio.

Referring to FIG. 2 and FIG. 3, FIG. 2 illustrates a relationship between the first value ε1 of the optical splitting ratio and the first value ε2 of the combining ratio at the different chirps (In the figure, a parameter α acts as the chirp of the outputting optical signal Oout). FIG. 3 illustrates a relationship between the first value ε1 of the optical splitting ratio and the optical modulation amplitude OMA of the outputting optical signal Oout at the different chirps. As can be seen from FIG. 2 and FIG. 3, at the different chirps, when the first value ε1 of the optical splitting ratio is equal to the first value ε2 of the combining ratio (that is, ε1=ε2), the optical modulation amplitude OMA of the outputting optical signal Oout has a maximum value. Therefore, by determining the chirp as desired and taking the optical splitting ratio and the combining ratio which corresponds to the chirp and are equal to each other to preset the optical modulating device 1, the present disclosure makes the outputting optical signal Oout have the chirp while make the optical modulation amplitude OMA maximized, to improve optical link budget.

Second Embodiment

Figure 4:
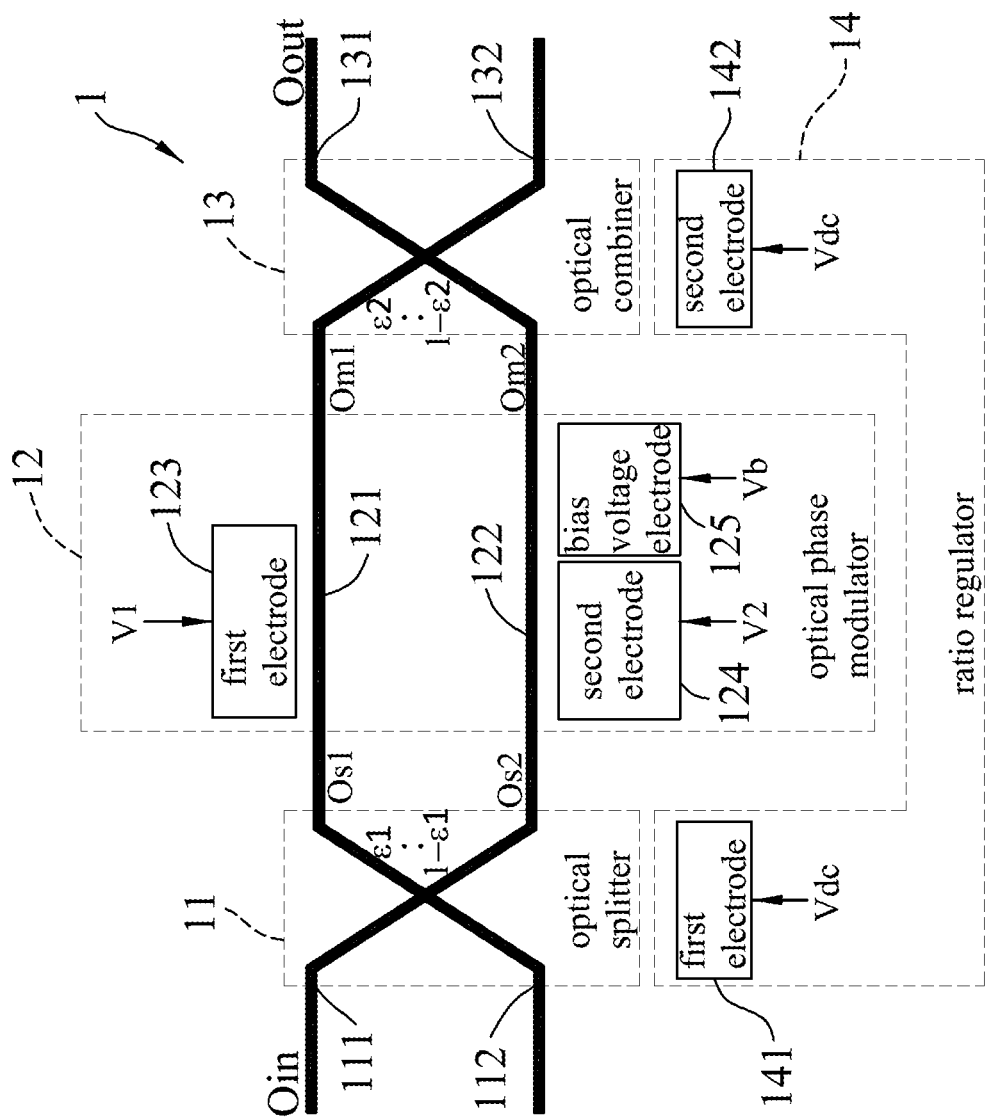
FIG. 4 is a plan diagram illustrating a second embodiment of the optical modulating device of the present disclosure.

Referring to FIG. 4, a second embodiment of the optical modulating device 1 of the present disclosure is similar to the first embodiment, but has a difference in that, in the second embodiment: (1) both the optical splitting ratio and the combining ratio are not constants (that is, are not preset); and (2) the optical modulating device 1 further includes a ratio regulator 14.

The ratio regulator 14 is used to receive a direct current voltage Vdc which is variable, and adjust the value the optical splitting ratio and the value of the combining ratio according to the direct current voltage Vdc. In the present embodiment, the ratio regulator 14 includes a first electrode 141 and a second electrode 142. The first electrode 141 is provided corresponding to and adjacent to the optical splitter 11, and is used to receive the direct current voltage Vdc. The second electrode 142 is provided corresponding to and adjacent to the optical combiner 13, and is used to receive the direct current voltage Vdc. Specifically, the first electrode 141 and the second electrode 142 respectively generate heat according to the direct current voltage Vdc, to adjust the value of the optical splitting ratio and the value of the combining ratio to which the first electrode 141 and the second electrode 142 correspond respectively. In the present embodiment, similarly, the combining ratio is equal to the optical splitting ratio, the value of the combining ratio is positive number and the value is less than one (1) or more than one (1).

In conclusion, by that the optical splitting ratio is equal to the optical combining ratio, the optical modulating device 1 of the present disclosure makes the outputting optical signal Oout outputted by the optical modulating device 1 have a larger optical modulation amplitude OMA, makes the outputting optical signal Oout still have a better signal-to-noise ratio when the outputting optical signal Oout is transmitted to the optical receiving device via the optical fiber, so that the optical receiving device has better demodulation accuracy when the optical receiving device demodulates according to the outputting optical signal Oout. Moreover, by that the outputting optical signal Oout has the optimized chirp in the optical modulating device 1, it may reduce effect of a dispersion caused by the optical fiber on transmission of the outputting optical signal Oout, in turn promote transmission performance of the optical communication system, and increase a transmission distance of the outputting optical signal Oout.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. An optical modulating device, comprising:
    an optical splitter which is used to receive an inputting optical signal and split the inputting optical signal by an optical splitting ratio to generate a first split optical signal and a second split optical signal;
    an optical phase modulator which couples the optical splitter to receive the first split optical signal and the second split optical signal and phase modulate the first split optical signal and the second split optical signal to respectively generate a first modulating optical signal and a second modulating optical signal; and
    an optical combiner which couples the optical phase modulator to receive the first modulating optical signal and the second modulating optical signal and combine the first modulating optical signal and the second modulating optical signal by a combining ratio to generate an outputting optical signal having a desired chirp, the combining ratio being equal to the optical splitting ratio as a predetermined value,
    wherein the predetermined value is configured to make the outputting optical signal have a max optical modulation amplitude at the desired chirp.

2. The optical modulating device of claim 1, wherein the optical phase modulator comprises:
    a first waveguide which is coupled between the optical splitter and the optical combiner, receives the first split optical signal from the optical splitter and generates the first modulating optical signal based on the first split optical signal,
    a second waveguide which is coupled between the optical splitter and the optical combiner, receives the second split optical signal from the optical splitter and generates the second modulating optical signal based on the second split optical signal,
    a first electrode which is provided corresponding to the first waveguide and is used to receive a first modulating voltage, a phase of the first modulating optical signal changes as the first modulating voltage changes, and
    a second electrode which is provided corresponding to the second waveguide and is used to receive a second modulating voltage, a phase of the second modulating optical signal changes as the second modulating voltage changes.

3. The optical modulating device of claim 2, wherein the chirp is a variable, the optical phase modulator further comprises:
    a bias voltage electrode which is provided corresponding to the second waveguide and the second electrode and is used to receive a bias voltage signal, the chirp of the outputting optical signal changes as the bias voltage signal changes.

4. The optical modulating device of claim 2, wherein the phase of the first modulating voltage and the phase of the second modulating voltage differ from each other by 180 degrees, and an amplitude of the first modulating voltage and an amplitude of the second modulating voltage are identical.

5. The optical modulating device of claim 1, wherein the optical splitter and the optical combiner each are a Y-branch waveguide.

6. The optical modulating device of claim 1, wherein the optical splitter and the optical combiner each are an optical directional coupler.

7. The optical modulating device of claim 1, wherein the optical splitter and the optical combiner each are a multi-mode interferometer.

8. The optical modulating device of claim 1, wherein both the optical splitting ratio and the combining ratio are constants.

9. The optical modulating device of claim 1, further comprising:
a ratio regulator which is used to receive a direct current voltage which is variable and adjust a value of the optical splitting ratio and a value of the combining ratio according to the direct current voltage.

10. The optical modulating device of claim 9, wherein the ratio regulator comprises:
a first electrode which is provided corresponding to the optical splitter and is used to receive the direct current voltage, and
a second electrode which is provided to corresponding to the optical combiner and is used to receive the direct current voltage.

* * * * *